United States Patent
Hakala et al.

[11] Patent Number: 5,962,948
[45] Date of Patent: Oct. 5, 1999

[54] ELEVATOR MOTOR WITH FLAT CONSTRUCTION

[75] Inventors: Harri Hakala, Hyvinkää ; Esko Aulanko, Kerava; Jorma Mustalahti, Hyvinkää, all of Finland

[73] Assignee: Kone Oy, Helsinki, Finland

[21] Appl. No.: 08/882,534

[22] Filed: Jun. 26, 1997

Related U.S. Application Data

[63] Continuation of application No. 08/415,458, Apr. 3, 1995, Pat. No. 5,783,895, which is a continuation-in-part of application No. 08/266,696, Jun. 28, 1994, Pat. No. 5,665,944, and a continuation-in-part of application No. 08/811,723, Mar. 6, 1997, Pat. No. 5,837,948.

[30] Foreign Application Priority Data

Apr. 7, 1994 [FI] Finland ..................... 941596

[51] Int. Cl.[6] ....................................... H02K 1/22
[52] U.S. Cl. ................ 310/268; 310/67 R; 310/68 R; 310/156; 310/254; 310/261; 187/108; 187/112
[58] Field of Search .................. 310/156, 67 R, 310/68 R, 260; 187/112, 108

[56] References Cited

U.S. PATENT DOCUMENTS

| | | | |
|---|---|---|---|
| 3,101,130 | 8/1963 | Bianca ........................ | 187/20 |
| 4,361,776 | 11/1982 | Hayashi et al. .................. | 310/268 |
| 4,633,113 | 12/1986 | Patel ........................ | 310/156 |
| 4,739,969 | 4/1988 | Eckersley et al. ................ | 254/368 |
| 4,814,654 | 3/1989 | Gerfast ...................... | 310/156 |
| 4,823,039 | 4/1989 | Lynch ...................... | 310/156 |
| 4,864,174 | 9/1989 | Kawamura et al. .............. | 310/261 |
| 4,960,186 | 10/1990 | Honda ...................... | 187/20 |
| 4,978,878 | 12/1990 | Dijken ...................... | 310/156 |
| 4,987,333 | 1/1991 | Noguchi et al. ................ | 310/156 |
| 5,018,603 | 5/1991 | Ito .......................... | 184/17 |
| 5,024,162 | 6/1991 | Nigg et al. ................... | 104/178 |
| 5,062,501 | 11/1991 | Pavoz et al. .................. | 187/112 |
| 5,079,461 | 1/1992 | Schlutter et al. ............... | 310/156 |
| 5,128,571 | 7/1992 | Itsu ........................ | 310/67 R |
| 5,140,212 | 8/1992 | Iwasaki et al. ................ | 810/191 |
| 5,144,183 | 9/1992 | Farrenkopf .................. | 310/268 |
| 5,146,144 | 9/1992 | Lee ........................ | 310/156 |
| 5,157,297 | 10/1992 | Uchida ..................... | 310/156 |
| 5,200,662 | 4/1993 | Tagami et al. ................ | 310/261 |
| 5,289,069 | 2/1994 | Hasegawa et al. .............. | 310/156 |
| 5,396,134 | 3/1995 | Mochizuki ................... | 310/67 R |
| 5,397,953 | 3/1995 | Cho ........................ | 310/156 |
| 5,440,185 | 8/1995 | Allwine, Jr. .................. | 310/156 |
| 5,493,161 | 2/1996 | Uno et al. ................... | 310/156 |
| 5,495,131 | 2/1996 | Goldie et al. ................. | 310/12 |
| 5,589,722 | 12/1996 | Sakaguchi et al. ............. | 310/180 |

FOREIGN PATENT DOCUMENTS

| | | | |
|---|---|---|---|
| 2127873 | 7/1993 | Canada ..................... | 310/268 |
| 96807 | 8/1975 | Japan . | |
| 277190 | 11/1988 | Japan . | |
| 131346 | 5/1990 | Japan . | |
| 80248 | 7/1992 | Japan . | |
| 1485305 | 9/1977 | United Kingdom . | |
| WO 93/14551 | 7/1993 | WIPO ..................... | 310/268 |

*Primary Examiner*—Elvin G. Enad

[57] ABSTRACT

An elevator motor (2) employing permanent magnets (30) attached in a circle on the surface (36) of the rotor disc (12). The rotor disc (12) forms part of both the magnetic circuit and the supporting structure of the rotor (13). The permanent magnets (30) are placed in a separate cavity formed in the stator disc and having one side open, said cavity also housing the stator windings (17). The outer cavity wall directed towards the rotor disc (12) is provided with a sealing member to close the cavity.

20 Claims, 4 Drawing Sheets

ELEVATOR MOTOR WITH FLAT CONSTRUCTION

This application is a continuation of application Ser. No. 08/415,458, filed on Apr. 3, 1995, now U.S. Pat. No. 5,783,895 which is a continuation-in-part of Ser. No. 08/266,696, filed Jun. 28, 1994, now U.S. Pat. No. 5,665,944 both of which are incorporated herein by reference. This application is also a continuation-in-part of Ser. No. 08/811,723, filed Mar. 6, 1997, now U.S. Pat. No. 5,837,948 which is incorporated herein by reference.

The present invention relates to an elevator motor.

The physical dimensions of an elevator machinery affect the size of the elevator shaft and/or the building, depending on where the machinery is placed. When the elevator machinery is placed in or beside the elevator shaft or in a machine room, the thickness of the machinery has an essential importance regarding the size required.

In patent specification U.S. Pat. No. 5,018,603, various types of elevator machinery are presented. The motor in FIG. 8 in the specification is a disc-type motor. The motors presented in the specification are clearly more compact and have a flatter construction in the axial direction of the shaft than conventional geared elevator machineries. However, the machineries presented in the specification are clearly designed for placement in an elevator machine room. The rotor in these machineries is a separate iron packet fixed to the rotor disc, with rotor windings embedded in it.

Another point to be noted about the gearless elevator machineries presented in the '603 specification is that the motor torque required is very large. The peripheral speed of the traction sheave, which is the outermost part, is higher than the peripheral speed of the rotor windings, so in a sense this machinery contains a gear increasing the speed of the elevator ropes, which is a drawback for most elevator drives.

SUMMARY OF THE INVENTION

The object of the present invention is to produce a new motor structure for a disc-type elevator motor using permanent magnets for rotor excitation, a structure that requires less space in the axial direction of the motor shaft, i.e. in the thickness-wise direction of the motor. Another object of the invention is to promote the accomplishment of an elevator motor as simple and compact as possible.

The invention makes it possible to achieve a very flat elevator machinery. Although the machinery has a very flat and compact construction, it contains all the ordinary equipment belonging to an elevator machinery, e.g. a traction sheave and a brake. The diameter of the traction sheave of the machinery is smaller than the diameter of the circumference of the permanent magnets, so the motor has a kind of reduction gear.

The motor of the invention is very simple in construction as it has a traction sheave and a brake disc integrated with the rotor disc and because the steelwork of the rotor both supports the rotor and forms part of the magnetic circuit.

The machinery has a good efficiency and the invention can also be applied to motors running at a very low speed (and having a very large diameter).

BRIEF DESCRIPTION OF THE DRAWINGS

The invention is described in the following by the aid of an embodiment, in which.

DETAILED DESCRIPTION OF THE PREFERRED EMBODIMENTS

Figure 1:
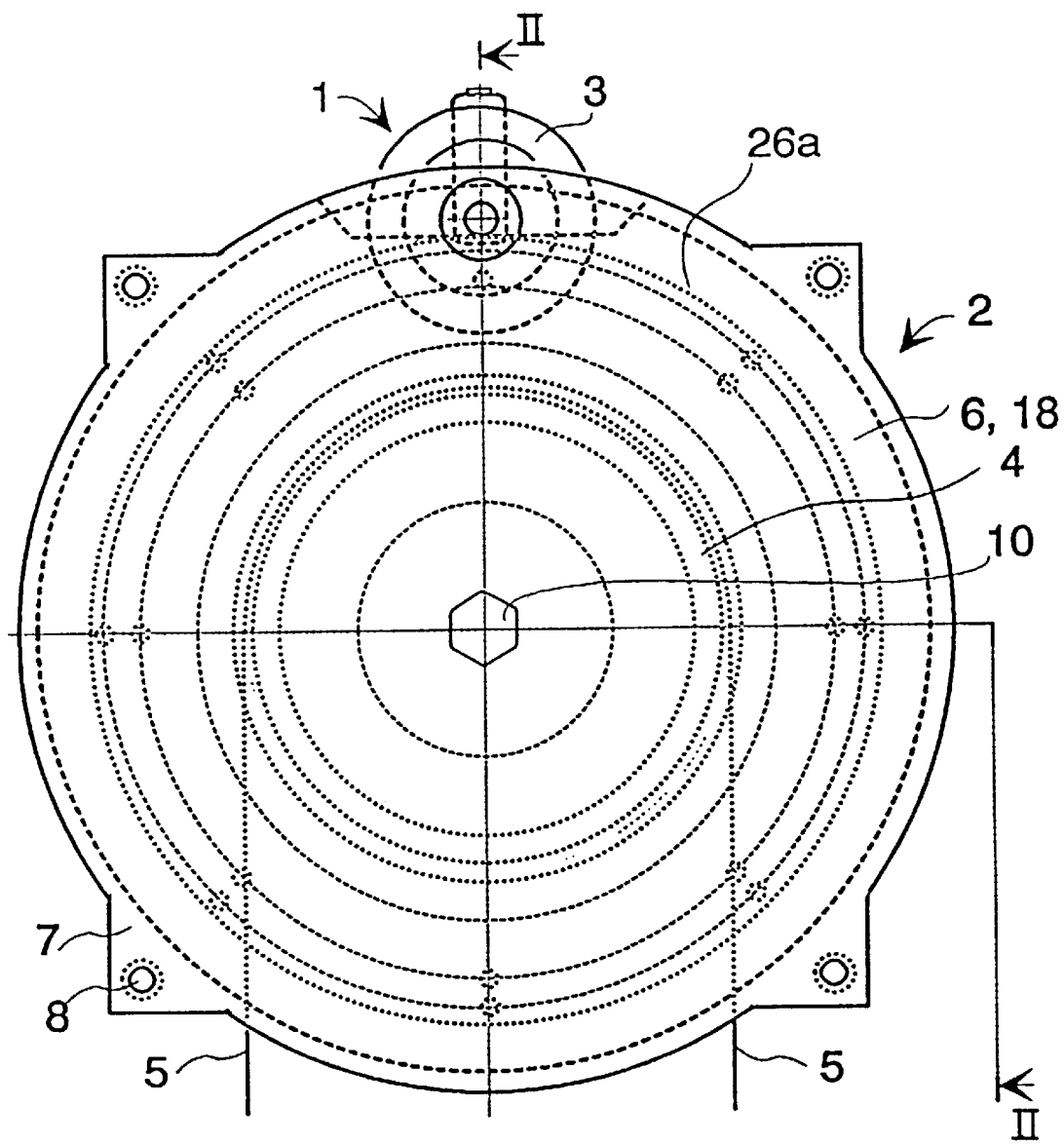
FIG. 1 presents an elevator machinery with a motor according to the invention.

FIG. 1 shows a front view of a gearless elevator machinery 1 with a disc-type motor 2, a disc brake 3 and a traction sheave 4. The elevator ropes 5 are passed around the traction sheave 4. The elevator machinery is assembled by means of connecting elements 8 placed between lugs provided in the stator disc 18 and in a support 6 attached to it. There is another connecting element 10 at the center of the machinery to join the support 6 and the stator disc 18 together. The brake 3 is attached to the support 6 and to the stator disc 18. Line II—II represents a section having the form of a fraction line, and this section is presented in FIG. 2. The motor may be e.g. a synchronous motor or a commutating d.c. motor. The machinery is capable of a very high efficiency, about 85%, which means that the machinery and its motor remain cooler during operation.

Figure 2:
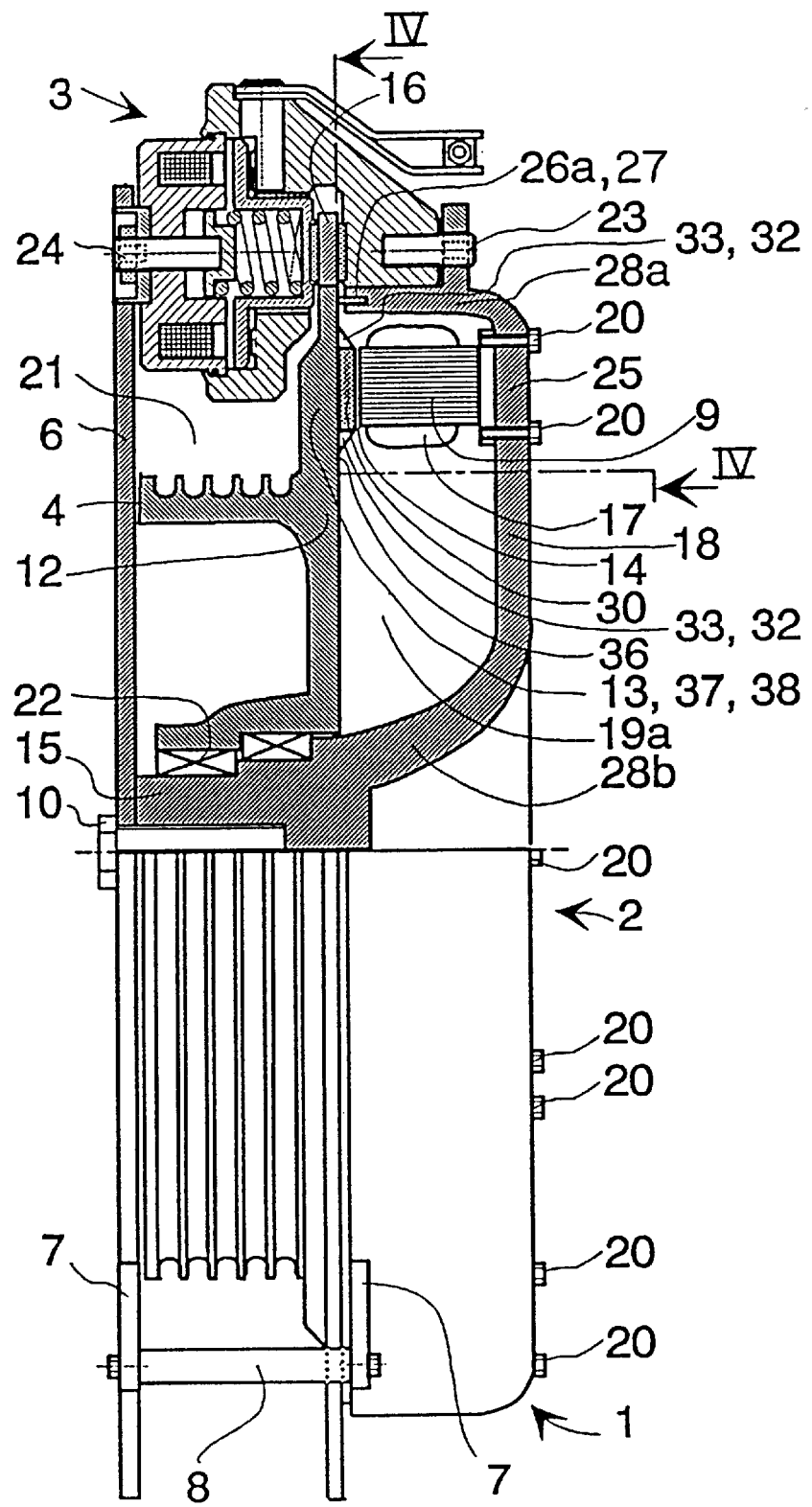
FIG. 2 presents a section of the elevator machinery.

FIG. 2 presents the elevator machinery 1 of FIG. 1 as sectioned along line II—II. The machinery 1 comprises a motor 2, a disc brake 3 with a brake disc 16, and a traction sheave 4. The figure shows the machinery magnified in the axial direction of the shaft 15 to render the figure more readable. The main parts of the motor 2 are the rotor 13, the stator disc 18 with a supporting plate 6 attached to it and with a shaft 15. The rotor 13 comprises a rotor disc 12 with permanent magnets and a traction sheave attached to it.

Figure 5:
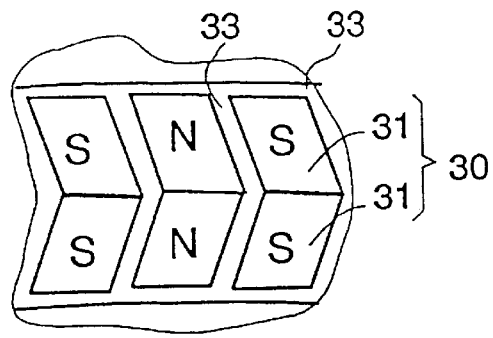
FIG. 5 presents permanent magnets composed of two component magnets.

The permanent magnets 30 are mounted in succession to form a circular ring on the surface 36 of the rotor disc 12. The part of the rotor disc 12 which lies under the permanent magnets 30 forms part of both the magnetic circuit 38 and the supporting structure 37 of the rotor disc 12. Because the traction sheave 4 can be located as shown in the figures or nearer to the permanent magnets, the sheave 4 can act as part of the magnetic circuit 38 and thus receives, directly, the torque delivered by the electric portion of the motor. The permanent magnets may vary in shape and they can be divided into component magnets 31 placed side by side or in succession. These component magnets may be e.g. of a rhomboidal form (FIG. 5).

The permanent magnets 30 are protected against external particles by an annular capsule formed by the stator disc 18 and provided with a sealing 26a on one of its walls. The traction sheave 4 is integrated with the rotor disc 12 or it may also be a separate part attached to the rotor disc. The diameter of the traction sheave 4 is smaller than that of the circumference of the permanent magnets 30. The rotor disc is provided with a ring-shaped brake disc 16 attached to the rotor disc as an extension of its periphery. Thus, the brake disc is substantially an immediate extension of the rotor disc, yet with a narrow annular area for a sealing between the rotor bars and the brake disc.

The rotor disc is advantageously manufactured as an integrated structure comprising the rotor disc, traction sheave and brake disc in a single unit. The disc brake 3 is mounted by means of attachments on both sides of the brake disc 16 so as to allow the brake to float in the lengthwise direction of the shaft 15. The floatable attachment of the disc brake is implemented using detachable brake supporting elements 23 and 24, by means of which the disc brake is attached on one side to the stator disc 18 and on the other side to the support 6 attached to the stator disc 18. The support 6 and the stator disc 18 are fixed together by means of the connecting elements 8 between the lugs 7 and with another connecting element 10 in the area of the shaft.

The spaces between the rotor disc 12 and the permanent magnets 30 on its surface as well as the corner 32 between the rotor disc and the permanent magnets are at least partially filled with non-magnetic filler material 33, such as polymerized resin, which is attached to the rotor disc 12 and the ppermanent magnets 30. Magnetic particles as well as ordinary impurities may gather in corners, and the purpose of the filler is to ensure that no sharp corners or recesses appear in the magnetic circuit. Particles can be more easily removed from flat surfaces and from surfaces with rounded corners.

The stator disc 18 has an annular cavity 19a with one side open. The outer annular wall 28a of the cavity 19a is directed towards the rotor disc 12 and the inner wall 28b is joined with the shaft 15. Between walls 28a and 28b is a wall 25 directed towards the shaft. The cavity with its walls can be characterized by the words capsule, capsule-shaped. The stator 9 comprises a stator core packet with windings 17. The stator has an annular shape and is placed near the outer (annular) wall 28a. If necessary, the stator may also be divided into separate sectors. The stator is attached to the cavity wall 25 perpendicular to the shaft by means of fixing elements 20, preferably screws. If desirable, the stator can be attached to any one of the cavity walls.

The permanent magnets 30 and the stator 9 are separated by an air gap 14 lying in a plane substantially perpendicular to the shaft 15 of the motor 2. Thus, the plane of the air gap may also be of a slightly conical shape.

The outer annular wall 28a is provided with an annular sealing 26a which lightly touches the rotor disc 12, thus rendering the cavity 19a a closed space which contains both the stator 9 and the permanent magnets 30 of the rotor 13. The sealing stop face in the rotor disc 12 lies between the brake disc 16 and the circle formed by the permanent magnets 30. The fixing element 27 required for the attachment of the sealing 26a is implemented as a groove in the axially oriented wall 28a of the cavity 19a in the stator disc 18. The sealing 26a may be e.g. a felt seal, a lap seal or a brush seal. The sealing protects the magnetic circuit against detrimental particles, such as magnetic dust.

The stator disc 18 and the shaft 15 are also integrated together as a single part, but naturally they can as well be implemented as separate parts joined together. Bearings 22 are provided between the stator disc 18 and the rotor disc 12

Figure 3:
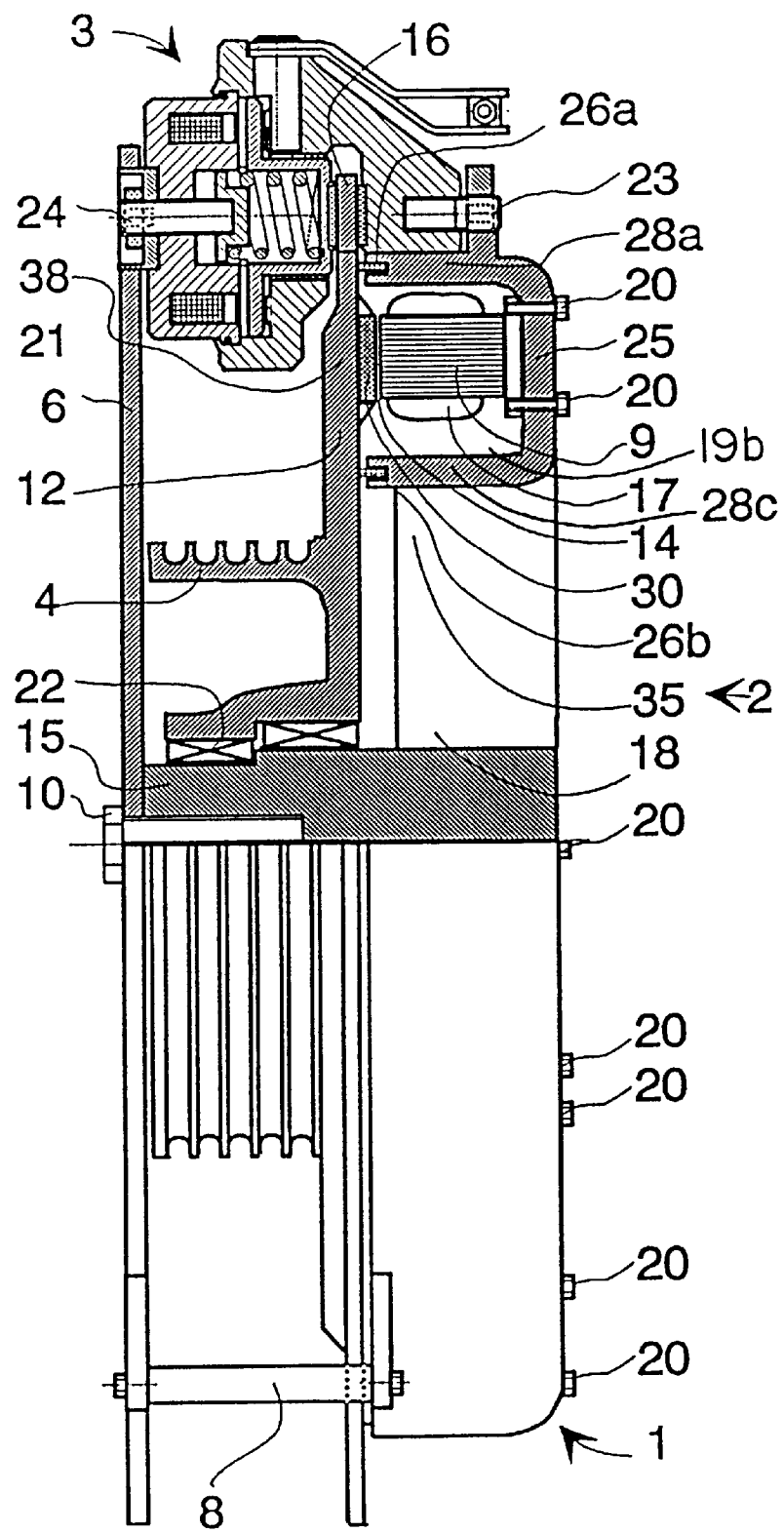
FIG. 3 presents another elevator machinery.

The motor in FIG. 3 is identical in structure with the motor in FIG. 2 except that the stator 9 is now placed in an annular cavity 19b formed by two walls 28a and 28c directed towards the rotor disc 12 and a wall 25 directed towards the shaft between them. One annular seal 26a is attached to the outer wall 28a of the cavity and another annular seal 26b to its inner wall 28c, which lies closer to the shaft 15. The inner wall 28c of the cavity 19b is attached to the shaft 15 by means of supporting ribs 35. Between the shaft and the supporting rib, a supporting element such as a collar may be provided. The motor structure presented in FIG. 3 is suited for motors with a particularly large diameter.

Figure 4:
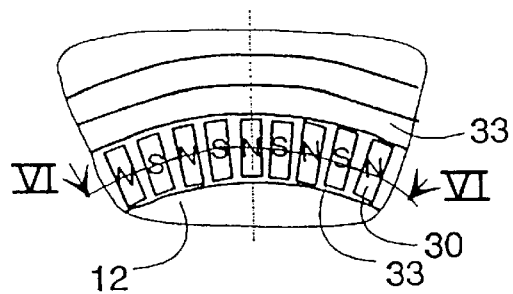
FIG. 4 presents some of the rectangular permanent magnets mounted in the rotor disc.

FIG. 4 presents section IV—IV of FIG. 3, showing part of the circle formed by the rectangular permanent magnets.

In FIG. 5, each permanent magnet 30 consists of two component magnets 31 of a rhomboidal shape placed one over the other. The component magnets are homopolar, i.e. their N and S poles are directed the same way in each magnet 30. Of course, the number of components in each magnet may be other than two. By using component magnets, it is possible to influence the form of the magnetic field and the magnets can be handled and mounted more easily than when a single larger magnet 30 is used.

Figure 6:
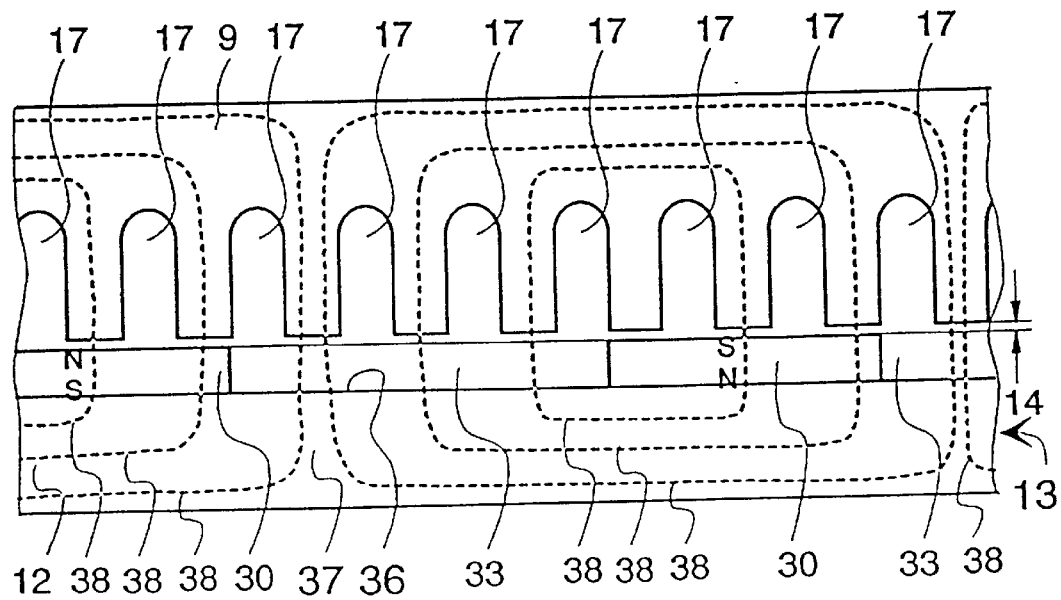
FIG. 6 illustrates the magnetic circuits in the rotor disc.

FIG. 6 presents section VI—VI of FIG. 4, straightened out into a plane. The figure also shows part of the stator windings 17. The magnetic field 38 is directed from the N or S pole of a permanent magnet across the air gap 14 to the stator 9, turns back across the air gap 14 towards an oppositely oriented permanent magnet 30 and passes then inside the rotor disc 12 back to the other pole S or N of the permanent magnet. The part of the rotor disc through which the magnetic field passes, in addition to forming part of the magnetic circuit, also acts as a supporting structure 37 of the rotor disc 12, transmitting the torque of the brake disc 16 to the traction sheave 4. If the traction sheave is integrated with the brake disc, part of the traction sheave can also act as a part of the magnetic circuit when the traction sheave is placed near the permanent magnets.

It is obvious to a person skilled in the art that the embodiments of the invention are not restricted to the examples described above, but that they may instead be varied within the scope of the claims presented below.

We claim:

1. An elevator motor comprising:

a stator;

a generally disc-shaped rotor support structure supporting a rotor including a plurality of permanent magnets attached to a first surface thereof and further having a second surface on another side of the rotor support structure, the first and second surfaces of the rotor support structure being substantially normal to a longitudinal axis of the rotor support structure; and a traction sheave extending outwardly from the second surface of the rotor support structure in a direction perpendicular to the second surface, wherein an airgap formed between the stator and the rotor lies in a plane substantially perpendicular to the longitudinal axis of the rotor support structure.

2. The elevator motor according to claim 1, wherein the permanent magnet are placed side by side in a direction radial from the longitudinal axis of the rotor disc.

3. The elevator motor according to claim 2, wherein the permanent magnets are each of a rhomboidal form.

4. The elevator motor according to claim 1, further comprising non-magnetic filler material attached to the permanent magnets for at least partially filling a space between the rotor disc and the permanent magnets, wherein said non-magnetic filler material at least partially fills a comer formed between the rotor disc and the permanent magnets.

5. The elevator motor according to claim 4, wherein said non-magnetic filler material is a polymerized resin.

6. The elevator motor according to claim 4, wherein the corner is a first corner between the permanent magnet and an axis of the rotor.

7. The elevator motor according to claim 6, wherein said non-magnetic filler material fills a second corner outside a circumference formed by the permanent magnets.

8. The elevator motor according to claim 1, wherein the permanent magnets are placed in succession in a circumferential direction about the longitudinal axis of the rotor disc.

9. The elevator motor according to claim 1, wherein the annular stator forms a complete circle.

10. The elevator motor according to claim 1, further comprising non-magnetic filler material attached to the permanent magnets for at least partially filling a space between the rotor disc and the permanent magnets, wherein said non-magnetic filler material is a polymerized resin.

11. The elevator motor according to claim 1, further comprising a brake disc connected to an outside periphery of said rotor support structure.

12. The elevator motor according to claim 1, wherein polarities of successive magnets alternate as considered along a circumferential direction of said rotor disc.

13. The elevator motor according to claim 1, wherein the torque of said motor is transmitted by said magnetic circuit to the motor support structure and to the traction sheave.

14. The elevator motor according to claim 1, wherein said traction sheave is integrally formed with said rotor support structure.

15. The elevator motor according to claim 1, wherein said permanent magnets are mounted in a generally circular arrangement, an outer diameter of the circular arrangement being greater than the diameter of said traction sheave.

16. The elevator motor according to claim 15, wherein an inner diameter of the circular arrangement is greater than the diameter of said traction sheave.

17. The elevator motor according to claim 1, wherein torque is transmitted directly transferred from the airgap to said traction sheave.

18. The elevator motor according to claim 1, wherein bearings support said rotor about the longitudinal axis of the rotor support structure such that said bearings, said traction sheave and the airgap are substantially aligned in a direction perpendicular to the longitudinal axis of the rotor support structure.

19. The elevator motor according to claim 1, wherein the axial width of the elevator motor is substantially less than the diameter of the elevator motor.

20. The elevator motor according to claim 1, wherein the diameter of the traction sheave is less than the diameter of the elevator motor.

* * * * *